United States Patent
Goldmann

(10) Patent No.: US 11,814,890 B2
(45) Date of Patent: Nov. 14, 2023

(54) CONTROL SYSTEM FOR AN ELECTRIC DRIVE ASSEMBLY OF A HATCH OF A MOTOR VEHICLE

(71) Applicant: Brose Fahrzeugteile SE & Co. Kommanditgesellschaft, Bamberg, Bamberg (DE)

(72) Inventor: Thomas Goldmann, Bayreuth (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 605 days.

(21) Appl. No.: 16/834,360

(22) Filed: Mar. 30, 2020

(65) Prior Publication Data
US 2020/0308893 A1 Oct. 1, 2020

(30) Foreign Application Priority Data
Apr. 1, 2019 (DE) .................... 10 2019 108 467.9

(51) Int. Cl.
*E05F 15/622* (2015.01)
*E05F 15/79* (2015.01)
(Continued)

(52) U.S. Cl.
CPC .......... *E05F 15/622* (2015.01); *B60R 16/005* (2013.01); *B60R 16/0231* (2013.01);
(Continued)

(58) Field of Classification Search
CPC ...... E05F 15/622; E05F 15/79; B60R 16/005; B60R 16/0231; E05Y 2400/36;
(Continued)

(56) References Cited

U.S. PATENT DOCUMENTS 7,362,068 B2 * 4/2008 Yamamoto ........... H02H 7/0851
49/31
8,093,849 B2 * 1/2012 Shibata ................... E05F 15/70
318/284
(Continued)

FOREIGN PATENT DOCUMENTS

DE 102007003004 A1 7/2008
DE 102014210404 A1 12/2015
(Continued)

*Primary Examiner* — Thai T Dinh
(74) *Attorney, Agent, or Firm* — Dickinson Wright PLLC

(57) ABSTRACT

A control system for an electric drive assembly of a hatch of a motor vehicle includes a drive assembly configured to reposition a hatch in motorized manner in a time-controlled motion process within a predetermined set hatch-motion time ($t_{soll}$) over a predetermined set hatch displacement ($s_{soll}$). The control system further includes a regulating unit that regulates the drive assembly to a set hatch speed ($v_{soll}$) during the motion process. Wherein, in a motion routine during the motion process, the control system ascertains a residual remaining hatch-motion time ($t_{Rest}$) continuously and computes the set hatch speed ($v_{soll}$) continuously in accordance with a computation rule on the basis of the remaining hatch-motion time ($t_{Rest}$) and supplies the hatch speed to the regulating unit.

17 Claims, 3 Drawing Sheets

(51) Int. Cl.
*B60R 16/00* (2006.01)
*B60R 16/023* (2006.01)
*B60J 5/10* (2006.01)

(52) U.S. Cl.
CPC ............ *B60J 5/10* (2013.01); *E05Y 2201/434* (2013.01); *E05Y 2201/702* (2013.01); *E05Y 2400/36* (2013.01); *E05Y 2900/546* (2013.01)

(58) Field of Classification Search
CPC ......... E05Y 2900/546; E05Y 2201/434; E05Y 2900/548
See application file for complete search history.

(56) References Cited

U.S. PATENT DOCUMENTS 8,875,442 B2 * 11/2014 Sohn .................... E05F 15/622
49/340
2005/0184694 A1 * 8/2005 Kalb ...................... E05F 15/41
318/452
2006/0181108 A1 * 8/2006 Cleland .................. E05F 15/43
296/146.4
2012/0123649 A1 * 5/2012 Eggers ................... E05F 15/73
701/49
2013/0024076 A1 * 1/2013 Fukui .................... E05F 15/622
701/49
2015/0096233 A1 * 4/2015 Kojima ..................... H02P 3/14
49/31
2019/0077234 A1 * 3/2019 Yagi ....................... B60J 5/106
2019/0128042 A1 * 5/2019 Junod .................... B60J 7/1607

FOREIGN PATENT DOCUMENTS

| EP | 2275634 A1 * | 1/2011 | ........... G05B 19/416 |
| EP | 2275634 B1 | 7/2014 | |
| WO | WO-2010054725 A1 * | 5/2010 | ............. E05F 15/40 |

* cited by examiner

CONTROL SYSTEM FOR AN ELECTRIC DRIVE ASSEMBLY OF A HATCH OF A MOTOR VEHICLE

CROSS-REFERENCE TO RELATED APPLICATIONS

This application claims priority to German Patent Application No. DE 10 2019 108 467.9, filed on Apr. 1, 2019, the disclosure of which is hereby incorporated in its entirety by reference herein.

TECHNICAL FIELD

The application relates to a control system for an electric drive assembly of a hatch of a motor vehicle and more specifically to a drive assembly with a control system and also to a method for actuating such a drive assembly.

BACKGROUND

The motorized repositioning of the hatches of motor vehicles constitutes an important convenience feature nowadays. In this connection, particular significance is attached to a high reproducibility of a motorized process for moving the hatch. This relates, in particular, to varying environmental conditions that should not result in an impairment of the motorized motion process. Such environmental conditions are, for instance, a sloping attitude of the motor vehicle, a snow load on the hatch in question, or such like.

A known control system (EP 2 275 634 B1) repositions the hatch in a time-controlled motion process. In this case, in one variant a repositioning-time-dependent motion profile has been defined. A regulating unit of the control system regulates the drive assembly to a set hatch speed which has been saved in the control system for the respective hatch-motion time.

In order to ensure that the respective set hatch speed can be attained in any environmental condition, in the known control system a certain control reserve is held in the regulating unit. The holding of such a control reserve is always associated with a corresponding over-dimensioning of the drive assembly.

SUMMARY

One problem underlying hatch closing is to configure and develop further the control system in such a manner that a more cost-effective design of the drive assembly is possible with simple control-engineering.

A fundamental perception underlying the solution as proposed is that the predetermined set hatch-motion time may be adhered to, even without the provision of a control reserve, if the set hatch speed is recomputed continuously with regard to the respective remaining hatch-motion time. Hence it is possible to "make up for" a delay in the hatch motion which, for instance, is attributable to a sloping attitude of the motor vehicle during the motion process by a corresponding computation of the set hatch speed.

With the solution as proposed, the concept of the presetting of a fixed motion profile is accordingly abandoned. Rather, the highest priority is given to the timely attaining of the set hatch displacement with regard to the set hatch-motion time. It has been recognized that a continuous computation of the set hatch speed on the basis of the remaining hatch-motion time is necessary. This is also associated with a simplification, to the extent that a storage and/or transfer of complicated motion profiles may be dispensed with.

In detail, it is proposed that in a motion routine during the motion process the control system ascertains the residual remaining hatch-motion time continuously and computes the set hatch speed continuously in accordance with a computation rule on the basis of the hatch-motion time and supplies said speed to the regulating unit.

Given suitable design, an over-dimensioning of the drive assembly, which is always attributable to the holding of a control reserve, is therefore not required. Rather, the drive assembly merely has to be designed to the effect that a possible delay in the hatch motion may be made up for again in any environmental condition.

According to one embodiment, the set hatch speed results from the remaining hatch displacement and the remaining hatch-motion time in accordance with the computation rule. Accordingly, the control system computes the set hatch speed in accordance with the remaining hatch-motion time that is still available for the remaining hatch displacement. The hatch motion may be represented by the motion of any drive component that corresponds to the hatch motion.

The control system as proposed may be directed toward the realization of motion processes that relate to a repositioning of the hatch from a standstill. The solution as proposed may accordingly be applied to a complete opening process and/or closing process of the hatch.

The term "continuous" in connection with the continuous computation, as proposed, of the set hatch speed is to be interpreted broadly. This term means, quite generally, that the set hatch speed is computed several times repeatedly during the motion process. In one or more embodiments, this means that the set hatch speed is computed in time-controlled manner, in particular cyclically. The cycle time in question may in this case have been predetermined or may have been defined in a manner depending on the hatch-motion time, on the hatch displacement, or like.

A variant for computing the remaining hatch-motion time is the subject of one or more claims. For example, a control system exhibits a time-measuring unit for ascertaining the motion time that has elapsed in the given case during the motion process, and computes the remaining hatch-motion time from the difference of the motion time that has elapsed in the given case from the set hatch-motion time. Accordingly, a simple time-measuring unit suffices in order to ascertain the remaining hatch-motion time.

Other configurations relate to preferred possibilities for further concretization of the computation of the set hatch speed. The control system may perform the computation of the set hatch speed in accordance with a computation rule additionally on the basis of predetermined limiting criteria for the set hatch speed, wherein a necessary condition in connection with the computation of the set hatch speed is the adherence to the predetermined limiting criteria, and in particular staying below a maximum hatch speed and/or exceeding a minimum hatch speed. The predetermined limiting criteria may have been defined in a manner depending on the traveled hatch displacement, on the remaining hatch displacement, on the elapsed motion time, and/or on the remaining hatch-motion time. The adherence to predetermined limiting criteria for the set hatch speed may be demanded, for instance, in order to adhere to maximum and/or minimum presets.

In a further configuration, the computed remaining hatch-motion time is subjected to a correction factor which may take into account the respective kinematic boundary conditions, for instance a hatch-motion-dependent spring loading of the hatch. Here it has been recognized that these kinematic boundary conditions inherent in the system may best be taken into account by a correction factor to which the computed remaining hatch-motion time is directly subjected.

In another configurations, a train of motions has been defined as a sequence of time-controlled motion processes, all the motion processes of the train of motions being executed in succession, as proposed, by the control system. Hence it is possible to travel various displacement segments with differing motion parameters, in particular with differing set motion time. This is one possibility to take the aforementioned kinematic boundary conditions into account.

According to a further teaching, to which autonomous significance is attached, a drive assembly with a control system is proposed. Reference may be made to all the remarks relating to the control system as proposed.

According to a further teaching, to which likewise autonomous significance is attached, a method is claimed for actuating an electric drive assembly of a hatch of a motor vehicle by the proposed control system. Also, in this respect, reference may be made to all the remarks relating to the proposed control system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
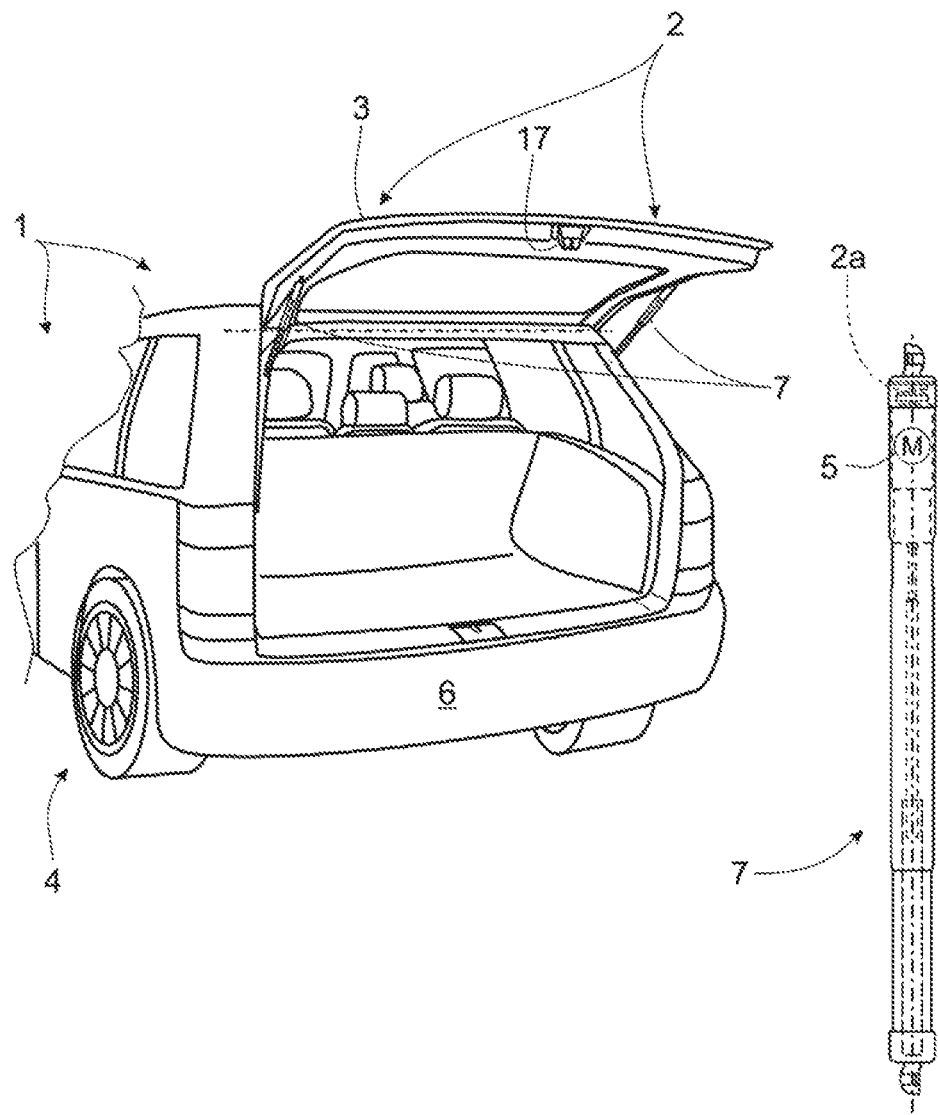
FIG. 1 is a rear view of a motor vehicle with a drive assembly as proposed, to which a control system as proposed has been assigned.

Referring to FIG. 1, the control system 1 as proposed serves for actuating a drive assembly 2 which has been assigned to a hatch 3 of a motor vehicle 4. The drive assembly 2 is equipped with at least one electric drive motor 5, in order to be able to reposition the hatch 3 in motorized manner.

The term "hatch" in the present case is to be interpreted broadly. Therefore, this term may refer to a tailgate, a trunk lid, a hood, a rear door, a side door, or the like. The hatch 3 is coupled to the motor-vehicle body 6 such that the hatch may pivot, swing, swiveling, slide, or the like. In the illustrated embodiment, the hatch 3 is a tailgate of the motor vehicle 4 that is pivotally attached the body 6. All the relevant remarks also apply to all other types of hatches.

The drive assembly 2 may be equipped with a drive 7, such as a spindle drive that includes the aforementioned drive motor 5. A pair of drives 7 may be provided on opposing sides of the hatch 3 as shown, or in other embodiment, a single drive may be used.

The drive assembly 2 moves the hatch 3 from a completely closed position (not shown) to a completely open position (shown in FIG. 1) The moving, or repositioning, of the hatch 3 may be referred to as a motorized opening process. Conversely, the drive assembly 2 also serves to reposition the hatch 3 from the completely open position into the completely closed position, which corresponds to a motorized closing process. The motorized repositioning may, in principle, also be undertaken from intermediate positions of the hatch 3.

Figure 2:
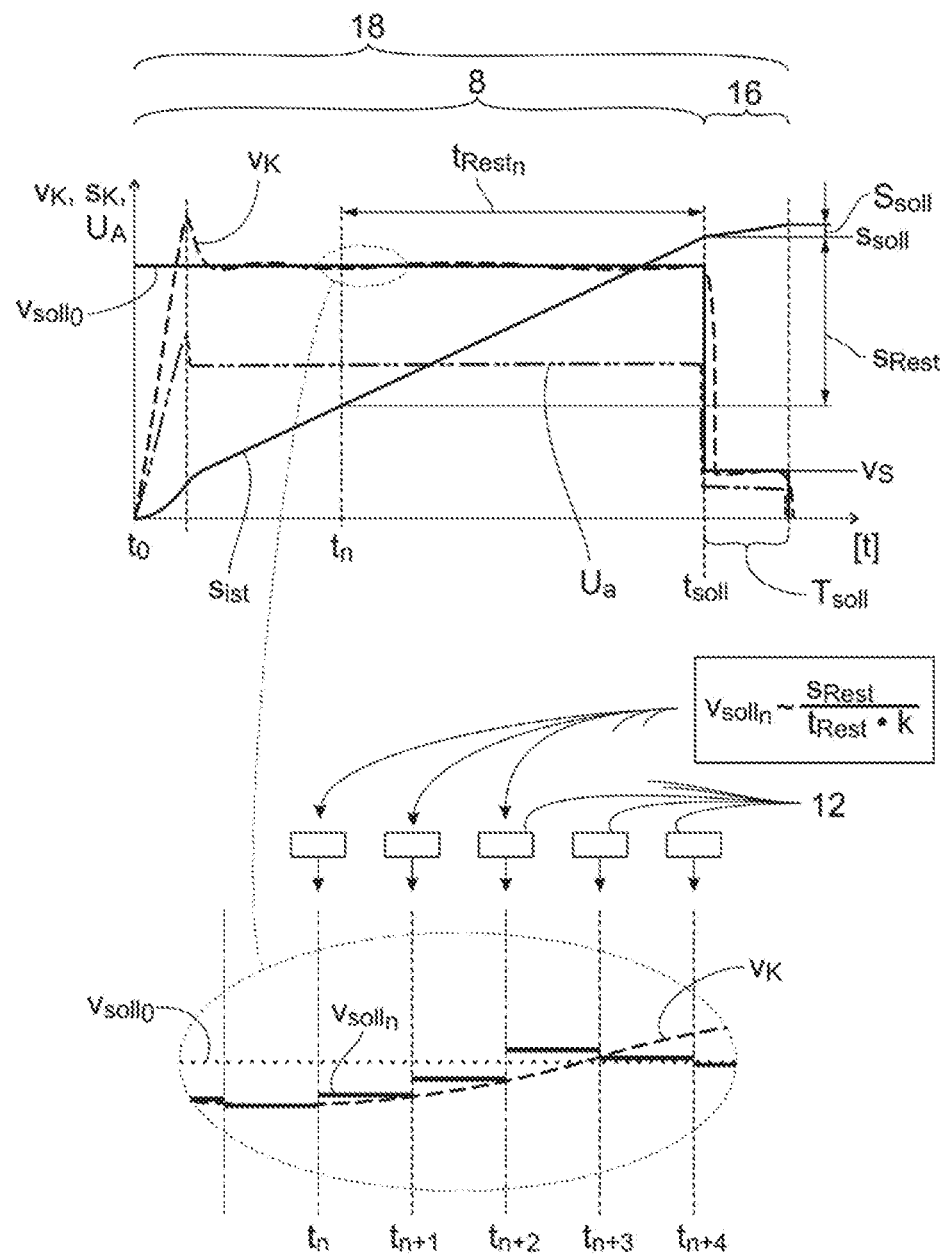
FIG. 2 is a representation of a time-controlled motion process by the control system of FIG. 1.

Referring to FIG. 2, the control system 1 commands the drive assembly 2 to reposition the hatch 3 in a motorized manner in a time-controlled motion process 8 in a predetermined set hatch-motion time $t_{soll}$ over a predetermined set hatch displacement $s_{soll}$.

Figure 3:
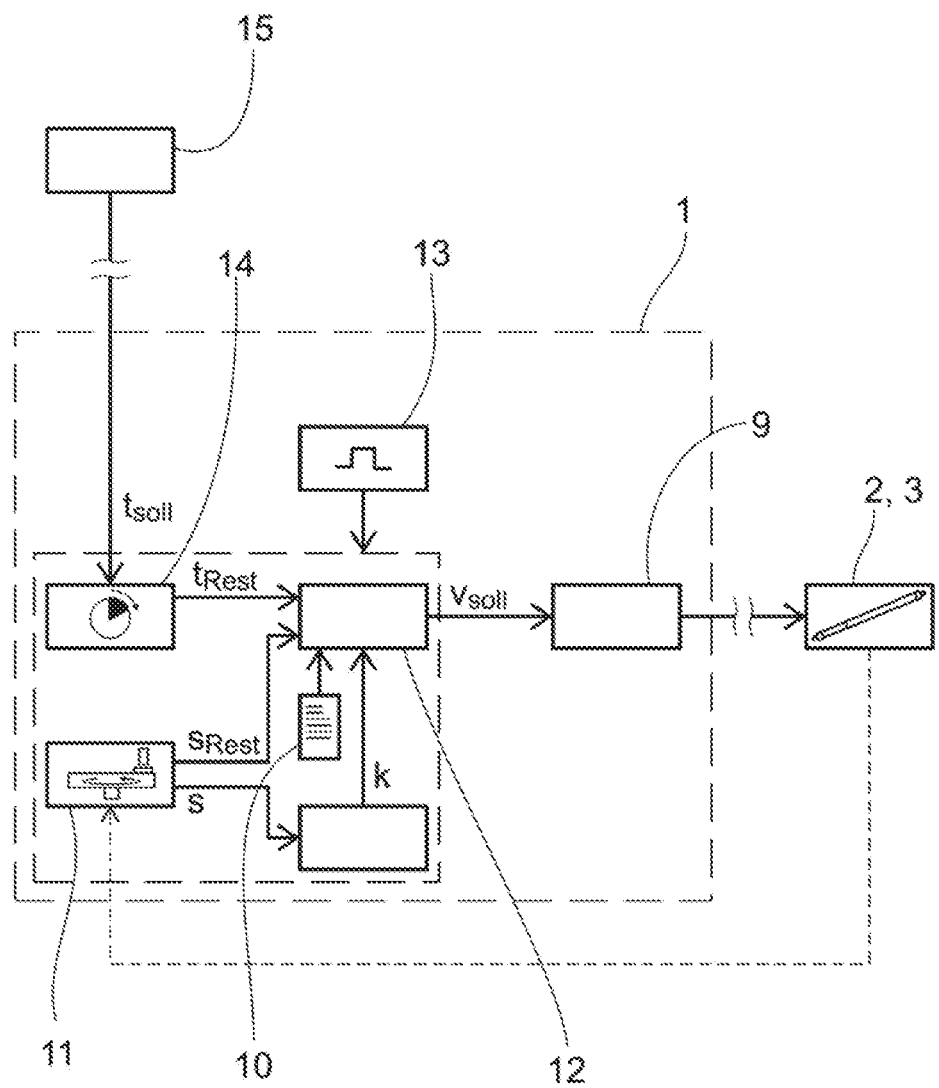
FIG. 3 is a schematic diagram of a control system associated with the drive assembly of FIG. 1.

FIG. 3 shows that the control system 1 exhibits a regulating unit 9 that regulates the drive assembly 2 to a set hatch speed $v_{soll}$ during the motion process 8. In the relevant representation according to FIG. 3, it is a question of a simplified representation, to the extent that the regulating unit 9, strictly speaking, exhibits a closed control loop, the controlled system of which is provided by the drive assembly 2 and the hatch 3. What is essential with respect to the regulating unit 9 is merely that the regulating unit 9 provides for the regulation of the drive assembly 2 to the respective set hatch speed $v_{soll}$.

As proposed, it is now the case that during the motion process 8 the control system 1 ascertains the residual remaining hatch-motion time $t_{Rest}$ continuously and computes the set hatch speed $v_{soll}$ continuously in accordance with a computation rule 10 on the basis of the remaining hatch-motion time $t_{Rest}$ and supplies the speed to the regulating unit 9. This means that the set hatch speed $v_{soll}$ is updated continuously with regard to the current remaining hatch-motion time $t_{Rest}$ in the given case. Hence, it is possible to react flexibly to environmental conditions such as a possible sloping of the motor vehicle 4, specifically in such a manner that the set hatch displacement $s_{soll}$ is traveled in exactly the set hatch-motion time $t_{soll}$. The motion profile—that is to say, the progression of the hatch speed $v_K$, the progression of the hatch acceleration $a_K$ or the progression of the hatch displacement $s_K$—plays a subordinate role in the actuation as proposed.

FIG. 3 shows that the control system 1 may include a displacement-measuring unit 11 for ascertaining the hatch displacement $s_K$ traveled in the given case, in which connection the control system 1 computes the remaining hatch displacement $s_{Rest}$ from the difference of the hatch displacement $s_K$ traveled in the given case from the set hatch displacement $s_{soll}$. In a computation unit 12 of the control system 1, the set hatch speed $v_{soll}$ is then computed in accordance with the computation rule 10 on the basis of the quotient formed from the remaining hatch displacement $s_{Rest}$ and the remaining hatch-motion time $t_{Rest}$. This is indicated in the representation according to FIG. 2. In the simplest case, according to FIG. 2, it is assumed that the remaining hatch-motion time $t_{Rest}$ is available for the remaining hatch displacement $s_{Rest}$ so that the set hatch speed $v_{soll}$ corresponds just to the quotient formed from the remaining hatch displacement $s_{Rest}$ and the remaining hatch-motion time $t_{Rest}$. Further computational strategies may be overlaid on this computation, for instance, in order to take the kinematic circumstances of the drive assembly 2 and/or of the hatch 3 into account.

It was already explained further above that the term "hatch motion" is to be interpreted broadly. Here, it is the case that within the scope of the actuation in the control system 1 the hatch motion is represented by the corresponding motion of a drive component of the drive assembly 2 for example of a drive shaft 2a of a drive motor 5 of the drive assembly 2. In the present case, this means that the hatch speed $v_K$, the hatch acceleration $a_K$ and the hatch displacement $s_K$ are represented by the speed, the acceleration and the displacement of the drive shaft 2a of the drive motor 5.

In the example of FIG. 2, the hatch 3 is stationary at the start of the time-controlled motion process 8, but in other embodiments, the time-controlled motion process 8 may start from a motion situation in which the hatch 3 is already moving at a certain hatch speed $v_K$.

Theoretically, it would be desirable if the control system 1 were to compute the set hatch speed $v_{soll}$ constantly. In the sense of a practically realizable variant, the control system 1 may compute the set hatch speed $v_{soll}$ in time-controlled manner, e.g., cyclically. This is indicated in FIG. 3 by a timing-pulse generator 13 assigned to the control system 1. A cycle time assigned to the timing-pulse generator 13 may lie within the range of a few milliseconds, e.g., around 5 ms. Other cycle times are contemplated.

For the purpose of ascertaining the motion time $t_K$ that has elapsed in the given case during the motion process 8, the control system 1 may exhibit a time-measuring unit 14, in which case the remaining hatch-motion time $t_{Rest}$ is computed by the control system 1 from the difference of the motion time $t_K$ that has elapsed in the given case from the set hatch-motion time $t_{soll}$.

The control system 1 may perform the computation of the set hatch speed $v_{soll}$ in accordance with the above computation rule 10 additionally on the basis of predetermined limiting criteria for the set hatch speed $v_{soll}$. For example, a necessary condition in connection with the computation of the set hatch speed $v_{soll}$ is the adherence to the predetermined limiting criteria. The limiting criteria may be, for instance, staying below a maximum hatch speed and/or exceeding a minimum hatch speed. Alternatively or additionally, the limiting criteria may be predetermined progressions of the hatch speed $v_K$, of the hatch acceleration $a_K$ or of the hatch displacement $s_K$. These progressions may also encompass maximum or minimum ramp angles of the quantity in question.

The limiting criteria may in the given case have been predetermined in terms of constants. Here, however, there is provision that the predetermined limiting criteria have been defined in a manner depending on the traveled hatch displacement $s_K$ and/or on the remaining hatch displacement $s_{Rest}$ and/or on the elapsed motion time $t_K$ and/or on the remaining hatch-motion time $t_{Rest}$.

In order to take the kinematic circumstances into account overall, there may be provision that within the scope of the computation of the set hatch speed $v_{soll}$ the system controller 1 subjects the remaining hatch-motion time $t_{Rest}$ to a correction factor k and takes this modified remaining hatch-motion time $t_{Rest}$ as a basis for the computation. In this case, the correction factor k may be defined in a manner depending on the traveled hatch displacement $s_K$ and/or on the remaining hatch displacement $s_{Rest}$ and/or on the elapsed hatch-motion time $t_K$ and/or on the remaining hatch-motion time. In the simplest case, there is provision that within the scope of the computation of the set hatch speed $v_{soll}$ the remaining hatch-motion time $t_{Rest}$ is normalized with the correction factor k in such a manner that the remaining hatch-motion time $t_{Rest}$ is multiplied by the correction factor k. Other variants for subjecting the remaining hatch-motion time $t_{Rest}$ to the correction factor k are conceivable.

A further possibility for the actuation, adapted to the kinematic boundary conditions, of the drive assembly 1 consists in a train of motions having been defined as a sequence of aforementioned time-controlled motion processes 8, in which case the control system 1 implements the motion routine for the sequence of the motion processes 8 in succession. The solution as proposed accordingly finds application within the scope of the train of motions in correspondingly repeated manner, namely for each motion process 8 of the train of motions individually.

In this case, a set hatch displacement $s_{soll}$ and a set hatch-motion time $t_{soll}$ have been respectively assigned to the motion processes 8 of the train of motions In the first-mentioned case, the overall hatch displacement to be traveled has accordingly been subdivided into individual displacement segments which each as such are traveled as proposed. Of interest in connection with the definition of such a train of motions, is the fact that differing motion parameters may find application depending upon the displacement segment. In particular, differing set hatch-motion times $t_{soll}$ may be used depending upon the displacement segment.

Correspondingly, it may be the case that the respective set hatch displacement $s_{soll}$ and/or the respective set hatch-motion time $t_{soll}$ of the motion processes 8 of the train of motions is/are different for at least some of the motion processes 8 of the train of motions. In an example configuration, the set hatch-motion time $t_{soll}$ of the motion processes 8 depends on the assigned set hatch displacement $s_{soll}$. Hence, a reaction may be brought about if, for instance, a sluggishness of the hatch 3 is to be expected in a particular displacement segment, by the set hatch-motion time $t_{soll}$ for the motion process 8 assigned to this displacement segment being increased.

The solution as proposed simplifies the request for a repositioning of the hatch—for instance, by a higher-level motor-vehicle controller 15—by merely a set hatch-motion time $t_{soll}$ and the set hatch displacement $s_{soll}$ being predetermined. Hence it is readily possible to make a human-machine interface (HMI) available to the user of the vehicle, in order to predetermine the set hatch-motion time $t_{soll}$ in normal operation. The—HMI may be a radio-frequency key or an input unit in the passenger compartment of the motor vehicle 4.

The mode of operation, as proposed, of the control system 1 within the scope of the time-controlled motion process 8 will be further explained with reference to FIGS. 2 and 3.

At instant $t_0$ the hatch 3 is at a standstill. The control system 1 as proposed receives, from a higher-level motor-vehicle controller 15, the request to transfer the hatch 3 from the open position represented in FIG. 1 into the completely closed position within a set hatch-motion time $t_{soll}$. Thereupon the control system 1 firstly ascertains the remaining hatch-motion time $t_{Rest}$, which at the start of the motion process 8 is still identical to the set hatch-motion time $t_{soll}$. Furthermore, the control system 1 computes the remaining hatch displacement $s_{Rest}$, which at the beginning of the motion process 8 is still the set hatch displacement $s_{soll}$. Lastly, the control system 1 computes the set hatch speed $v_{soll}$ in accordance with the computation rule 10 via the computation unit 12. As shown in the representation according to FIG. 2, the set hatch speed $v_{soll}$ is just the quotient formed from the remaining hatch displacement $s_{Rest}$ and the remaining hatch-motion time $t_{Rest}$ which is subjected to the correction factor k. This first set hatch speed $v_{soll}$ is designated in FIG. 2 as $v_{soll0}$.

From the upper representation shown in FIG. 2 it may be gathered that the set hatch speed $v_{soll}$ at instant $t_0$ undergoes a jump to the set hatch speed $v_{soll0}$. Thereupon the regulating unit 9 provides, by an appropriate wiring of the drive motor 5 to a drive voltage $U_a$, for an appropriate acceleration of the hatch 3, which in FIG. 2 is manifested in a resultant hatch speed $v_K$. FIG. 2 shows that the hatch speed $v_K$ overshoots slightly, ultimately depending on the respective design of the regulating unit 9.

The above computation of the set hatch speed $v_{soll}$ is now repeated cyclically. The relevant cycles are labeled in FIG. 2 by $t_n$, $t_{n+1}$, $t_{n+2}$ . . . . From the detailed representation shown in FIG. 2 it may be gathered that the set hatch speed $v_{soll}$ is altered slightly in each cycle, specifically in a manner depending on the remaining hatch displacement $s_{Rest}$ and the remaining hatch-motion time $t_{Rest}$. From this representation it may be gathered that with the solution as proposed it is readily possible to attain the set hatch displacement $s_{soll}$ at the instant of the elapsing of the set hatch-motion time $t_{soll}$.

From the representation according to FIG. 2 it may further be gathered that the time-controlled motion process 8 is followed immediately by at least one further motion process for example, by precisely one further motion process 16 which may be an aforementioned time-controlled motion process or a motion process actuated in some other way. Here, the control system 1 may then actuate the drive assembly 1 to reposition the hatch 3 in motorized manner in the at least one further motion process 16 within a predetermined set hatch-motion time $T_{soll}$ over a predetermined set hatch displacement $S_{soll}$. The further motion process 16 serves here for inserting the hatch 2 into a motor-vehicle lock 17 assigned to the hatch 3. A constant set hatch speed $v_S$ may be assigned to this inserting of the hatch 3.

Overall, the control system 1 actuates the drive assembly 2 to reposition the hatch 3 in a closing process 18 between an open position and a closed position, the closing process 18 being composed of at least one time-controlled motion process 8, in an aforementioned train of motions, and the motion process 16, which may be at a constant set speed $v_S$. This is conceivable in reverse for the realization of an opening process between a closed position and an open position, in which case, the opening process is composed correspondingly of at least one time-controlled motion process 8, and a further motion process 16. The motion processes 8 and 16 may be progressively linked to one another.

The motion process 16 may, as explained above, immediately follow the time-controlled motion process 8. But, in principle, the motion process 16 may also immediately follow the train of motions.

According to a further teaching, to which autonomous significance is attached, the drive assembly 2 with a control system 1 as proposed is claimed as such. Reference may be made to all the remarks relating to the control system 1 as proposed.

According to a further teaching, to which likewise autonomous significance is attached, a method is claimed as such for actuating a drive assembly 2 as proposed by a control system as proposed. Also, in this respect, reference may be made to all the remarks relating to the mode of operation of the drive assembly 2 as proposed and also of the control system 1 as proposed.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

control system 1
drive assembly 1
system controller 1
drive assembly 2
drive shaft 2a
hatch 3
motor vehicle 4
drive motor 5
body 6
drive 7
motion process 8
unit 9
computation rule 10
displacement-measuring unit 11
computation unit 12
timing-pulse generator 13
time-measuring unit 14
vehicle controller 15
motion process 16
motor-vehicle lock 17
closing process 18

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A control system for an electric drive assembly of a hatch of a motor vehicle, wherein the control system is configured to reposition the hatch in motorized manner in a time-controlled motion process within a predetermined set hatch-motion time ($t_{soll}$) over a predetermined set hatch displacement ($s_{soll}$), the control system comprising:
    a regulating unit that regulates the drive assembly to a set hatch speed ($v_{soll}$) during the motion process; wherein
    in a motion routine during the motion process, the control system ascertains a residual remaining hatch-motion time ($t_{Rest}$) continuously and computes the set hatch speed ($v_{soll}$) continuously in accordance with a computation rule on the basis of the residual hatch-motion time ($t_{Rest}$) and supplies the hatch speed to the regulating unit; and
    a time-measuring unit for ascertaining an elapsed motion time ($t_K$) of the motion process, wherein the control system computes the remaining hatch-motion time ($t_{Rest}$) from the difference of the motion time ($t_K$) and the set hatch-motion time ($t_{soll}$).

2. The control system as claimed in claim 1 further comprising a displacement-measuring unit for ascertaining the hatch displacement ($s_K$) traveled, and wherein the control system computes the remaining hatch displacement ($s_{Rest}$) from the difference of the hatch displacement ($s_K$) and the set hatch displacement ($s_{soll}$).

3. The control system as claimed in claim 1, wherein the control system computes the set hatch speed ($v_{soll}$) in accordance with the computation rule on the basis of the quotient formed from the remaining hatch displacement ($s_{Rest}$) and the remaining hatch-motion time ($t_{Rest}$).

4. The control system as claimed in claim 1, wherein the the drive assembly includes a drive shaft and a drive motor, and wherein motion of the hatch is represented by corresponding motion of the drive shaft.

5. The control system as claimed in claim 1, wherein at the start of the time-controlled motion process, the hatch is stationary.

6. The control system as claimed in claim 1, wherein the control system computes the set hatch speed ($v_{soll}$) cyclically.

7. The control system as claimed in claim 1, wherein the control system performs the computation of the set hatch speed ($v_{soll}$) in accordance with the computation rule (10) additionally on the basis of predetermined limiting criteria for the set hatch speed ($v_{soll}$), wherein a necessary condition in connection with the computation of the set hatch speed ($v_{soll}$) is an adherence to the predetermined limiting criteria staying below a maximum hatch speed and/or exceeding a minimum hatch speed.

8. The control system as claimed in claim 7, wherein the predetermined limiting criteria have been defined in a manner depending on the traveled hatch displacement ($s_K$) and/or on the remaining hatch displacement ($s_{Rest}$) and/or on the elapsed motion time ($t_K$) and/or on the remaining hatch-motion time ($t_{Rest}$).

9. The control system as claimed in claim 1, wherein, within the scope of the computation of the set hatch speed ($v_{soll}$), the control system subjects the remaining hatch-motion time ($t_{Rest}$) to a correction factor (k), wherein the correction factor (k) has been defined in a manner depending on the traveled hatch displacement ($s_K$) and/or on the remaining hatch displacement ($s_{Rest}$) and/or on the elapsed motion time ($t_K$) and/or on the remaining hatch-motion time ($t_{Rest}$).

10. The control system as claimed in claim 1, wherein a motion cycle is a sequence of time-controlled motion processes and wherein the control system executes the motion routine for the sequence of motion processes of the motion cycle in succession and wherein a set hatch displacement ($s_{soll}$) and a set hatch-motion time ($t_{soll}$) have been respectively assigned to the motion processes of the motion cycle.

11. The control system as claimed in claim 10, wherein the set hatch displacement ($s_{soll}$) or the set hatch-motion time ($t_{soll}$) of the motion processes of the motion cycle is different for at least some of the motion processes of the motion cycle, and wherein the set hatch-motion time ($t_{soll}$) of the motion processes depends on the assigned set hatch displacement ($s_{soll}$).

12. A method for actuating an electric drive assembly of a hatch of a motor vehicle, the method comprising:
via a control system having a regulating unit:
repositioning the hatch, via the drive assembly, in a time-controlled motion process within a predetermined set hatch-motion time ($t_{soll}$) over a predetermined set hatch displacement ($s_{soll}$),
regulating the drive assembly, via the regulating unit, during the motion process to a set hatch speed ($s_{soll}$),
wherein the time-controlled motion process includes a motion routine in which a residual remaining hatch-motion time ($t_{Rest}$) is ascertained continuously and the set hatch speed ($v_{soll}$) is computed continuously in accordance with a computation rule on the basis of the remaining hatch-motion time ($t_{Rest}$) and is supplied to the regulating unit, and
ascertaining an elapsed motion time ($t_K$) of the time-controlled motion process, wherein the residual remaining hatch-motion time ($t_{Rest}$) is computed from the difference of the elapsed motion time ($t_K$) and the set hatch-motion time ($t_{soll}$).

13. A drive assembly comprising:
an actuator configured to reposition a hatch relative to a vehicle body; and
a controller programmed to command the actuator to move the hatch between an open position and a closed position at a set hatch speed that is based on a remaining hatch displacement and a remaining hatch-motion time such that the hatch moves between the open and closed position within a predetermined set hatch-motion time regardless of environmental factors acting on the hatch; and
a time-measuring unit configured to output an elapsed motion time for the hatch, wherein the controller is further programmed to compute the remaining hatch-motion time from the difference between the motion time and the set hatch-motion time.

14. The drive assembly according to claim 13 further comprising a displacement-measuring unit configured to output a displacement traveled by the hatch, and wherein the controller is further programmed to (i) receive the displacement traveled and (ii) determine the remaining hatch displacement based on a difference between a displacement between the open and closed positions and the displacement travelled.

15. The drive assembly according to claim 13, wherein the controller is further programmed to compute the set hatch speed based on a quotient formed from the remaining hatch displacement and the remaining hatch-motion time.

16. The drive assembly according to claim 13, wherein the controller is further programmed to cyclically calculate the residual remaining hatch-motion time and to cyclically calculate the set hatch speed.

17. The drive assembly according to claim 13, wherein the actuator includes an electric motor.

* * * * *